US008019917B2

(12) United States Patent
Chen et al.

(10) Patent No.: US 8,019,917 B2
(45) Date of Patent: Sep. 13, 2011

(54) DIGITAL VIDEO/AUDIO CAPTURE DEVICE AND METHOD THEREOF

(75) Inventors: Yu-Min Chen, Chiayi (TW); Chun-Chiao Wang, Taipei (TW)

(73) Assignee: Quanta Computers Inc., Tao Yuan Shien (TW)

( * ) Notice: Subject to any disclaimer, the term of this patent is extended or adjusted under 35 U.S.C. 154(b) by 153 days.

(21) Appl. No.: 12/604,581

(22) Filed: Oct. 23, 2009

(65) Prior Publication Data
US 2010/0185795 A1    Jul. 22, 2010

(30) Foreign Application Priority Data
Jan. 20, 2009   (TW) ............................... 98102072 A (51) Int. Cl.
*G06F 13/38*    (2006.01)
(52) U.S. Cl. ................. 710/36; 710/16; 710/17; 710/30
(58) Field of Classification Search .................. None
See application file for complete search history.

(56) References Cited

U.S. PATENT DOCUMENTS

| 5,903,261 | A  | * | 5/1999  | Walsh et al. ............... 715/201 |
| 6,404,980 | B1 | * | 6/2002  | Yagi et al. ..................... 386/240 |
| 6,914,903 | B1 | * | 7/2005  | Miyazaki et al. ............ 370/389 |
| 2002/0126987 | A1 | * | 9/2002  | Kamiya ......................... 386/68 |
| 2006/0232808 | A1 | * | 10/2006 | Lyons et al. ................ 358/1.13 |

* cited by examiner

*Primary Examiner* — Ilwoo Park
(74) *Attorney, Agent, or Firm* — Rabin & Berdo, P.C.

(57) ABSTRACT

In audio/video (AV) capture, two video streaming adapters (VSAs) receive an original input video signal and a compressed input video signal respectively to generate an uncompressed video streaming and a compressed video streaming respectively. The uncompressed video streaming and the compressed video streaming are transmitted to an external device by way of time division duplex. An interlock mechanism prevents concurrent transmission of the uncompressed video streaming and the compressed video streaming, so that the loss of real-time video streaming is reduced.

19 Claims, 4 Drawing Sheets

DIGITAL VIDEO/AUDIO CAPTURE DEVICE AND METHOD THEREOF

This application claims the benefit of Taiwan application Serial No. 98102072, filed Jan. 20, 2009, the subject matter of which is incorporated herein by reference.

BACKGROUND

1. Field

The application relates in general to a digital audio/video (AV) capture device and a method thereof, and more particularly to a digital AV capture device and a method thereof, capable of outputting an uncompressed video streaming and a compressed video streaming.

2. Description of Background

Current USB video device class (UVC) audio/video products can be used in Windows XP SP2 and later operating systems or Vista system in a plug-and-play manner without installing any driver. Examples of the UVC AV products include digital webcam, digital camera, analog image converter, TV stick and etc. Webcam, which is one of earliest AV products that support UVC protocol, is widely used and has a large demand in the market.

As the built-in digital webcam has become a standard equipment of a notebook computer, more application of the built-in digital webcam are developed. For example, notebook or personal computer with a built-in digital webcam can be used in digital home or video conference. For this kind of application, video streaming is indispensable. Let video conference be taken for example. Normally, the video streaming has two formats: compressed signal format (such as MPEG) for transmission on the network, and uncompressed signal format (such as YUV format) for playing at local terminal.

Figure 1:
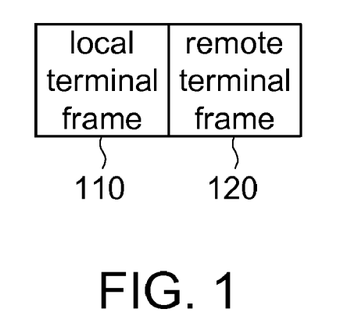
FIG. 1 shows a conference frame displayed on a display unit during a video conference.

FIG. 1 shows a conference frame displayed on a display unit (such as the screen of a notebook or a personal computer) during video conference. As in FIG. 1, during video conference, both a local terminal frame 110 and a remote terminal frame 120 are shown on the display unit. The local terminal frame 110 is a uncompressed video streaming outputted from the built-in digital webcam and played on the display unit of the local terminal computer. The remote terminal frame 120 is a compressed signal outputted from the remote terminal, decompressed by the local terminal computer and played on the display unit of the local terminal computer.

The conventional digital webcam is disadvantaged by supporting one video format transmission only. For example, all the video streamings outputted from the conventional digital webcam are uncompressed. Therefore, during video conference, the local terminal computer performs compression/decompression, such as, compressing the uncompressed video streaming outputted from the digital webcam and transmitting to the remote terminal computer through a network, and decompressing and playing the compressed signal transmitted from the remote terminal computer. However, the above operation will make the local computer overloaded with compression/decompression.

Thus, example of the invention provide new digital AV capture configuration. The conventional configuration which supports only one flow of UVC real-time isochronous transfer is improved to be capable of supporting two flows of isochronous transfer (that is, capable of transmitting both a compressed video streaming and an uncompressed video stream) by one USB digital AV capture element only (such as only one USB digital webcam). The local terminal computer concurrently receives the video streaming in two formats, so the load of performing compression and decompression by the local terminal computer is reduced.

Moreover, the new USB digital AV capture configuration according to examples of the invention automatically adds a UVC compliant payload header to the video streaming, hence making the implementation in video conference or digital home easier.

SUMMARY OF THE INVENTION

Examples of the invention are directed to an audio/video (AV) capture device and a method thereof. According to the concept of time division duplex, a compressed video streaming and an uncompressed video streaming can be outputted in time division duplex by only one universal serial bus (USB) digital AV capture element. The local terminal computer concurrently receives two formats of video streaming, so the load of performing compression and decompression by the local terminal computer is reduced.

Examples of the invention are directed to an AV capture device and method thereof. As the USB video class (UVC) payload header can be automatically added, the load of the micro controller is relieved and loss of real-time data is reduced. Thus, the implementation of video conference or digital home is made easier.

According to a first example of the present invention, an AV capture device is provided. The AV capture device includes a signal source, an AV processor, a first video streaming adapter (VSA), a second video streaming adapter (VSA), a micro controller, and a transmission unit. The signal source captures an external image to generate a first input video signal. The AV processor receives and compresses the first input video signal generated by the signal source to generate a second input video signal. The first VSA receives the first input video signal generated by the signal source and adds a first payload header onto the first input video signal to generate a first video streaming. The second VSA receives the second input video signal generated by the AV processor and adds a second payload header onto the second input video signal to generate a second video streaming. The micro controller generates a command to the first VSA and the second VSA. The transmission unit, coupled to the first VSA and the second VSA, transmits the first video streaming generated by the first VSA and the second video streaming generated by the second VSA to an external device by time division duplex. Wherein, the first VSA and the second VSA communicate with each other through an interlock mechanism to avoid the first VSA and the second VSA concurrently outputting the first and the second video streaming to the transmission unit.

According to a second example of the present invention, a digital AV capture method is provided. An external image is captured to generate a first input video signal. The first input video signal is received and compressed to generate a second input video signal. The first input video signal is received and a first payload header is added onto the first input video signal to generate a first video streaming. The second input video signal is received and a second payload header is added onto the second input video signal to generate a second video streaming. The first video streaming and the second video streaming are transmitted to an external device by time division duplex. An interlock mechanism is performed during time division duplexing transmission to avoid the first and the second video streaming being concurrently transmitted to the external device.

Examples of the invention will become apparent from the following detailed description of the non-limiting embodiments. The following description is made with reference to the accompanying drawings.

DETAILED DESCRIPTION OF EXAMPLES OF THE INVENTION

According to the new USB digital AV capture configuration provided in the embodiments of the invention, the isochronous transfer of two formats of video streaming (that is, a compressed video streaming and an uncompressed video streaming are concurrently transmitted) is supported by time division duplex. The local terminal computer concurrently receives two formats of video streaming, so the load of performing compression and decompression by the local terminal computer is reduced.

According to the new USB digital AV capture configuration provided in the following embodiments of the invention, a UVC compliant payload header is automatically added, hence making the implementation of video conference or digital home easier.

Figure 2A:
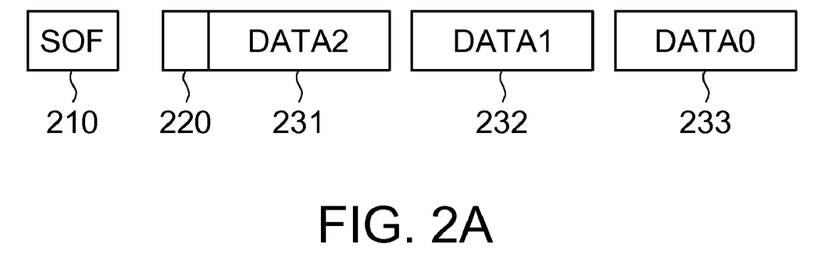
FIG. 2A~FIG. 2C show a micro frame of a video streaming.
Figure 2B:
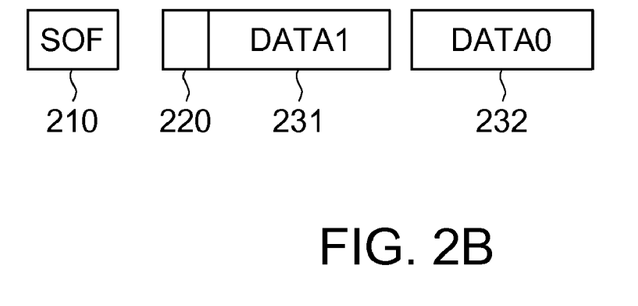
Figure 2C:
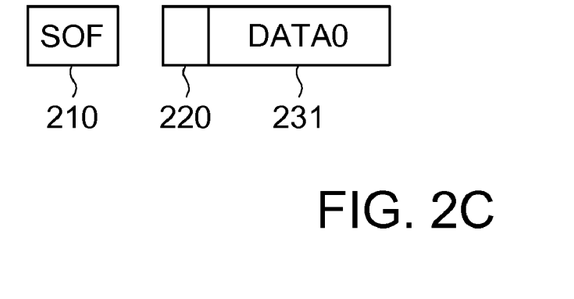

Here below, a video streaming includes video and/or audio data. FIG. 2A~FIG. 2C show a micro frame in a video streaming, respectively. As indicated in FIG. 2A~FIG. 2C, a micro frame includes a start of frame (SOF) 210, a payload header 220 and a plurality of real-time data packets 231~233. In each micro frame, the payload header 220 must be updated and is located at the start of the first real-time data packet. Generally speaking, a UVC payload header includes the following information such as whether the streaming belongs to the same video frame, whether the streaming is in a photo mode, whether the streaming is an end of video frame, and the total time length of the video streaming. The real-time data packets 231~233 include AV data.

Conventionally, the payload header is filled in by a micro controller inside a digital webcam internal. In a USB micro frame, normally the micro controller has to complete the following operations: 1. Collect the information required in the payload header such as timestamp and so on. 2. Copy the AV data of the current micro frame to the memory in which the payload header is stored, wherein the storage position of the AV data must be after that of the payload header. 3. Control the digital webcam to sequentially output the payload header and the AV data. 4. Confirm that the digital webcam has completed output of data.

The above operations must be repeated once within each micro frame, that is, within every 125 microsecond (125 μsecond). A micro controller may not be able to complete the above operations within the above time limit if the processing speed of the micro controller is too slow or the micro controller has other tasks to perform at the same time. If the above operations cannot be finished within the time limit, the AV data may be lost and the real-time AV transmission cannot be achieved.

Therefore, in the hardware configuration provided in the embodiment of the invention, a part of the payload header information is automatically updated or retrieved by other element than the micro controller, and during transmitting a micro frame, other element than the micro controller outputs the payload header first and the AV data next. The micro controller largely reduces the job required for real-time streaming transmission, not only making the system more efficiently but also avoiding the loss of video data.

Figure 3:
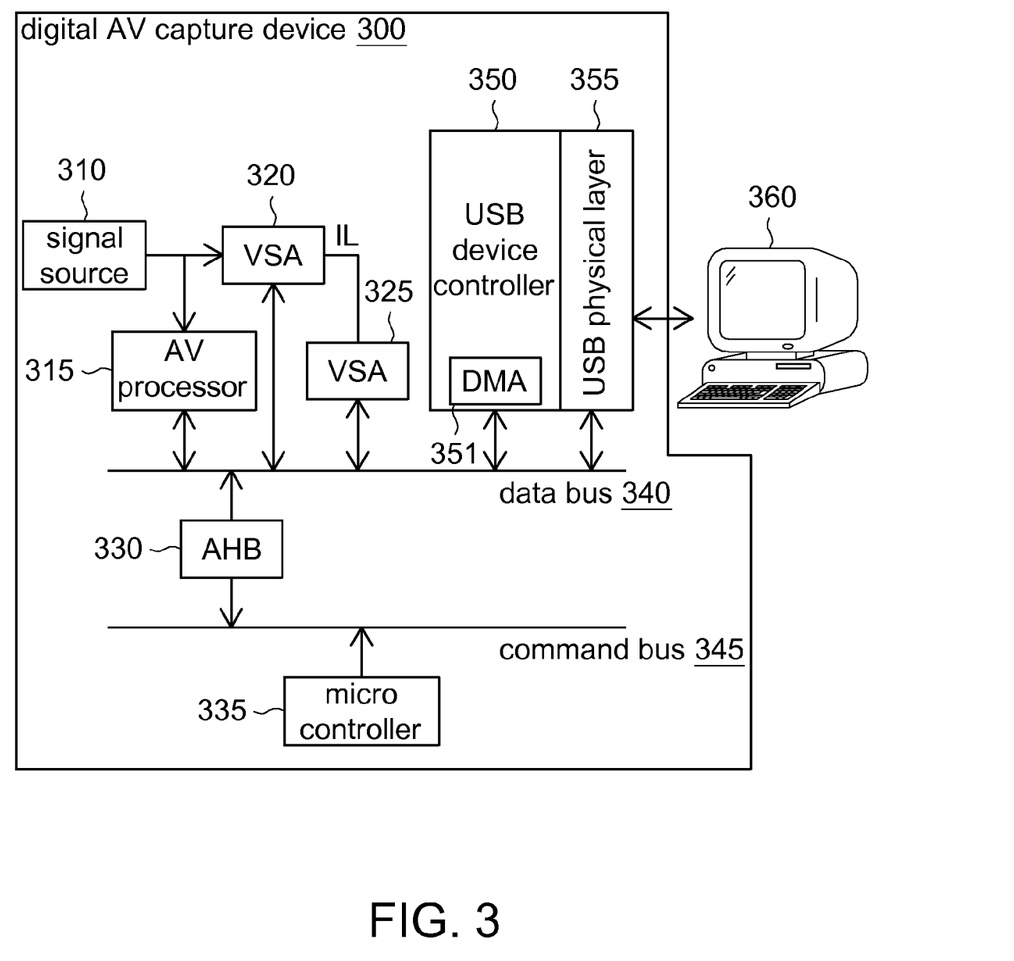
FIG. 3 shows a block diagram of a digital AV capture device capable of supporting USB and UVC according to an embodiment of the invention.

Referring to FIG. 3, a block diagram of a digital AV capture device capable of supporting USB and UVC according to an embodiment of the invention is shown. As indicated in FIG. 3, the digital AV capture device 300 includes a signal source 310, an AV processor 315, two video streaming adapters (VSA) 320 and 325, an advanced high-performance bridge (AHB) 330, a micro controller 335, a data bus 340, a command bus 345, a USB device controller 350 and a USB physical layer 355. The USB device controller 350 at least includes a direct memory access (DMA) 351.

The digital AV capture device 300 supports two flows of USB and UVC compliant video streaming, but only one USB device controller is required for transmitting the two flows of video streaming to the PC 360 at back stage. Furthermore, the bandwidth of the two flows of video streaming can be dynamically changed so that the maximum bandwidth of USB isochronous transfer can achieve 24.576 MB/sec. The digital AV capture device 300 automatically adds a UVC compliant payload header.

The photo-sensing element inside the signal source 310 captures an external image to generate a video signal which enters both the VSA 320 and the VSA 325 respectively. The flow of video signal that enters the VSA 320 is uncompressed video signal, and the other flow of video signal is processed by the AV processor 315 and then enters the VSA 325. For example, the signal is compressed as H.264 format by the AV processor 315.

The AV processor 315 compresses the video signal generated by the signal source 310 and further transmits the compressed video signal to the VSA 325.

When the VSA 320 receives the uncompressed video signal and the VSA 325 receives the compressed video signal, the VSAs 320 and 325 encode the received video signals as video streamings. Also, the VSAs 320 and 3255, according to the parameter from the micro controller 335, automatically add a UVC compliant payload header and automatically set the DMA 351 of the USB device controller 350 through the data bus 340 so as to transmit the two flows of video streaming to the PC 360 by time division duplex.

In the present embodiment of the invention, only one of the VSAs 320 and 325 at a time can transmit data to the PC 360 through the USB device controller 350. Thus, by way of an interlock mechanism and an interlock signal IL, only one of the VSAs 320 and 325 at a time can transmit data. That is, the VSA 325 has to wait when the VSA 320 transmits a part of uncompressed video streaming to the PC 360 in one micro frame. To the contrary, the VSA 320 has to wait when the VSA 325 transmits a part of compressed video streaming to the PC 360 in one micro frame.

The uncompressed video streaming transmitted to the PC 360 from the VSA 320 can be played on the PC 360 directly, and the compressed video streaming transmitted to the PC 360 from the VSA 325 can be further transmitted from the PC 360 to be sent and played on a remote terminal computer.

The AHB 330 serves as a bridge between two buses having different transfer rates. The micro controller 335 writes command on the command bus 345 and sets the USB device controller 350 through the AHB 330 so as to support UVC isochronous data transfer.

The command bus 345 is used for transmitting a command, a parameter, an instruction, and so on. The data bus 340 is used for transmitting AV data. Thus, the USB real-time video streaming that require high speed transmission and the command that does not require high speed transmission can be separated and transmitted through two different internal buses, not only assuring the accuracy of the video streaming but also meeting the effectiveness of the micro controller 335 in processing the commands.

The USB device controller 350 is used for transmitting the uncompressed video streaming transmitted from the VSA 320 and the compressed video streaming transmitted from the VSA 325 to the PC 360 by way of time division duplex. Moreover, after the USB device controller 350 transmits one data packet, the USB device controller 350 will inform the VSA 320 or 325, retrieve a next packet from the VSA 320 or 325 and further transmit the next packet to the DMA 351. That is, the VSA 320 or 325 transmits one data packet (and its payload header if the data packet is the first one in the micro frame) at a time to the DMA 351.

The USB physical layer 355 is an interface between the USB device controller 350 and the PC 360.

Figure 4:
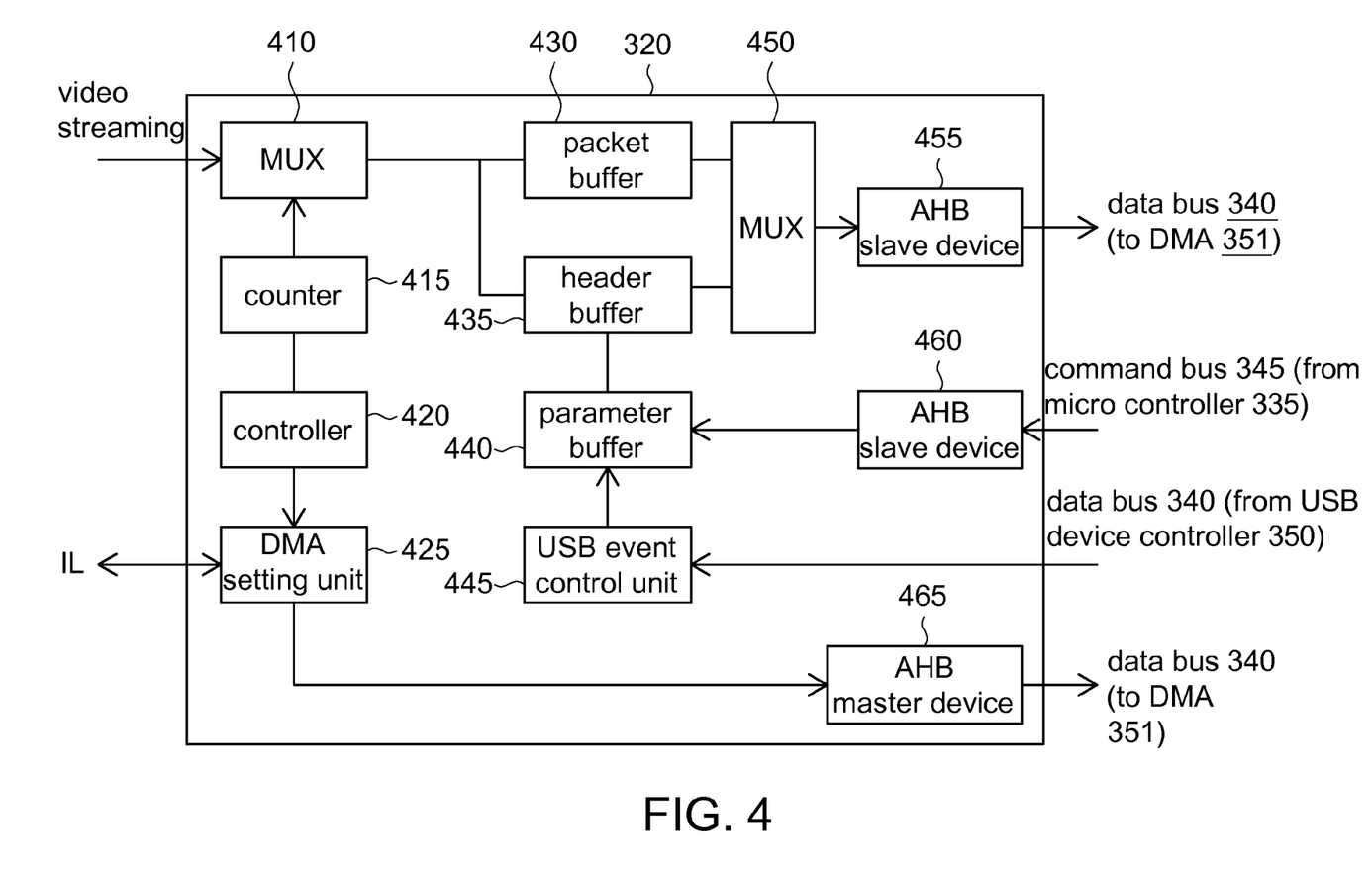
FIG. 4 shows a VSA configuration according to the embodiment of the invention.

Next, referring to FIG. 4, the VSA configuration according to the embodiment of the invention is shown. In the present embodiment of the invention, the VSAs 320 and 325 are the same or similar and are exemplified by the VSA 320 here.

As indicated in FIG. 4, the VSA 320 includes a multiplexer (MUX) 410, a counter 415, a controller 420, a DMA setting unit 425, a packet buffer 430, a header buffer 435, a parameter buffer 440, a USB event control unit 445, an MUX 450, an AHB slave device 455, an AHB slave device 460 and an AHB master device 465.

The parameter buffer 440 is used for temporarily storing parameters. The parameter transmitted from the micro controller 335 is written to the parameter buffer 440 through the command bus 345 and the AHB slave device 460. Examples of the parameter include packet size parameter.

The counter 415 is used for counting data amount passing through the multiplexer 410. According to the parameter transmitted from the micro controller 335 and then stored in the parameter buffer 440, when the counter 415 counts that the data amount of the multiplexer 410 is equal to one packet size, the counter 415 packs the data as a packet and further stores the packet in the packet buffer 430.

When packing the data as a packet, the counter 415 informs the controller 420 to start to encode a part of the UVC compliant payload header and store it in the header buffer 435. The part of the UVC compliant payload header after encoding includes the following information such as whether the stream belongs to the same video frame, whether the stream is in a photo mode, whether the stream is an end of video frame and etc. Next, the counter 415 arranges the sequence of the real-time data packet as indicated in FIG. 2A~FIG. 2C.

When at least one packet is temporarily stored in packet buffer 430, the DMA setting unit 425 of the VSA 320 informs the DMA 351 to transmit data. However, whether the data bus 340 and the DMA 351 are currently used by the other VSA must be checked through an interlock mechanism before the VSA uses the DMA 351 to transmit data. If the data bus 340 and the DMA 351 are currently used by the other VSA, then the VSA cannot transmit data until the other VSA has completed the transmission of a micro frame and released the control of bus usage. The operation of the interlock mechanism is disclosed below.

The USB event control unit 445 detects whether the transmission of each real-time data packet is completed. For example, when the DMA 351 completes the transmission of a real-time data packet, the USB device controller 350 sends a pulse signal back to the USB event control unit 445 through the data bus 340. After receiving the pulse signal, the USB event control unit 445 informs the DMA setting unit 425, the DMA setting unit 425 communicates with the DMA 351, so that a next packet stored in the packet buffer 430 is transmitted to the DMA 351 through the multiplexer 450, the AHB slave device 455 and the data bus 340.

The multiplexer 450, according to the control signal from other elements, determines whether to output the data packet or the payload header, so that the output sequence of the payload header and the data packet is conformed to FIG. 2A~FIG. 2C.

After the setting of the AHB master device 465 is completed, the DMA 351 of the USB device controller 350 retrieves a real-time data packet stored in the packet buffer 430 through the AHB slave device 455. During the retrieval of data, the controller 420, according to the format of the current video streaming, adds another part of the UVC compliant payload header payload header. For example, a time length of the video streaming is added. Thus, the transmission of the video streaming is completed.

Figure 5:
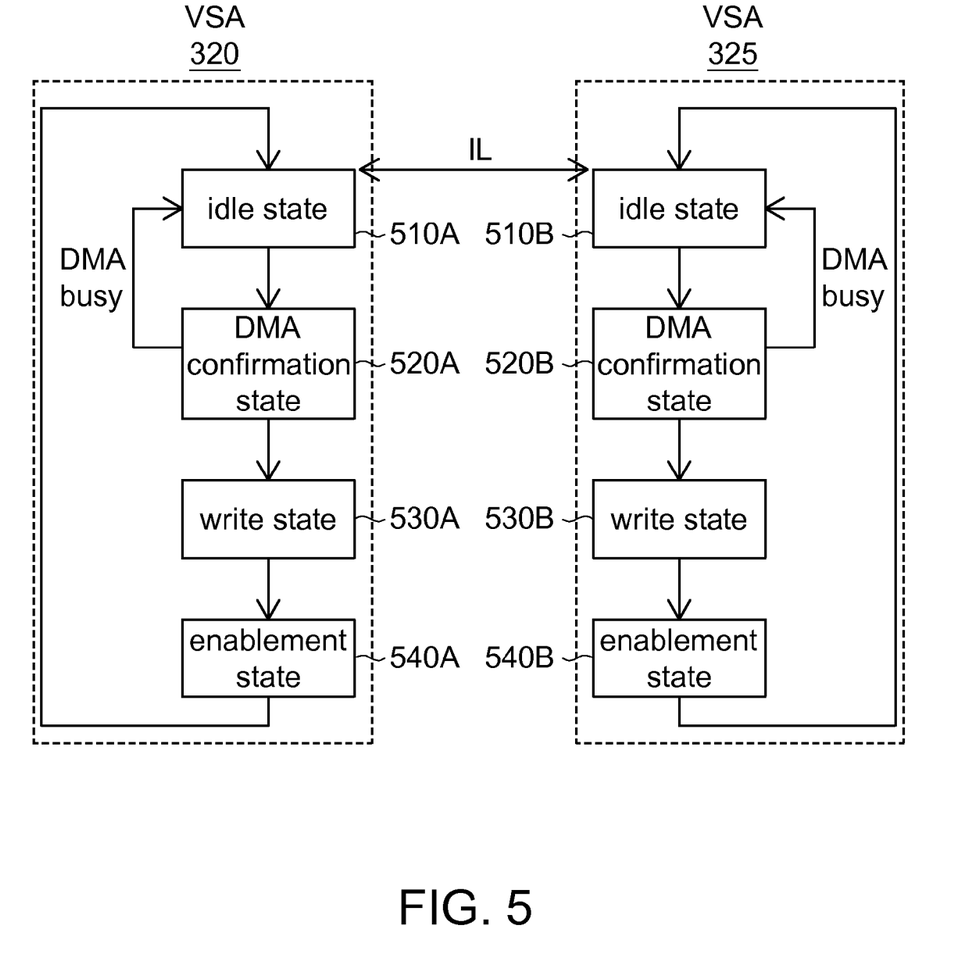
FIG. 5 shows the states of an interlock mechanism according to the embodiment of the invention.

The DMA setting unit 425 communicates with the DMA 351 through the AHB master device 465 and further sets the DMA 351. Referring to FIG. 5, how the DMA setting unit 425 sets the DMA 351 is illustrated. Further, the interlock mechanism is performed by the DMA setting unit 425.

The AHB slave devices 455 and 460 and the AHB master device 465 are interfaces between the VSAs and other elements. Particularly, the AHB slave device 455 is an interface between the VSA and the DMA 351, the AHB slave device 460 is an interface between the VSA and the micro controller 335, and the AHB master device 465 is an interface between the VSA and the DMA 351.

In FIG. 4, the VSA 320 receives the uncompressed video streaming transmitted from the signal source 310; and the VSA 325 receives the compressed video streaming transmitted from the AV processor 315.

In the present embodiment of the invention, the AV capture device has two VSAs but only one USB device controller 350. Thus, during the setting of the DMA 351, the interlock mechanism is employed to avoid interrupt of the transmission of the isochronous packet by the VSAs 320 and 325 and avoid the VSAs 320 and 325 using the USB device controller 350 at the same time (that is, in the manner of time division duplex transfer) if the USB bandwidth is sufficient. The operations of the interlock mechanism according to the embodiment of the invention are illustrated in FIG. 5. The VSA 320 is used as an exemplification below. However, the operations of the VSA 325 are the same.

At the beginning, the DMA setting unit 425 is at an idle state 510A. When receiving the USB transmission command, the DMA setting unit 425 enters a DMA confirmation state 520A to check whether the DMA is busy.

If the DMA is busy (this implies that the other VSA) is transmitting data through the DMA 351), then the DMA setting unit 425 returns to the idle state 510A. If the DMA 351 is ready (not busy), then the DMA setting unit 425 enters into a write state 530A.

In the write state 530A, the DMA setting unit 425 writes some relevant parameters (such as the size, the number and the storage address) of the packet to the DMA 351.

After that, the DMA setting unit 425 enters into an enablement state 540A to activate the DMA 351 for retrieving the data packet stored in the packet buffer 430 and transmitting the retrieved data packet to the PC 360. On entering into the write state 530A, the DMA the setting unit 425 sends an interlock signal IL to the VSA 325, so that the DMA setting unit of the VSA 325 maintains at the idle state and cannot use the DMA 351 to transmit data, hence avoiding loss of the real-time video streaming caused by the concurrence of two flows of video streaming. After the transmission of a micro frame is completed, the DMA the setting unit 425 enters into the idle state 510A from the enablement state 540A, so the control of the data bus 340 is passed to the other VSA. That is, the VSA 325 cannot transmit a compressed micro frame before the VSA 320 has completed the transmission of an uncompressed micro frame. The states 510B~540B are similar to the states 510A~540A, and the details are not repeated here.

According to the USB 2.0 high speed protocol, 8000 micro frames are transmitted per second, up to three real-time data packets are included in one micro frame, and the maximum size of each real-time data packet is 1024 bytes. Thus, the maximum bandwidth of each isochronous endpoint is 24.576 MB/sec. In USB protocol, under transmission bandwidth of 24.576 MB/sec, up to two isochronous endpoints are supported; that is, the sum of the maximum bandwidth of two isochronous endpoints is 49.152 MB/s.

The embodiment of the invention has three use modes as indicated in the table below. In the first use mode, only the uncompressed video streaming (YUYV format) is transmitted, and the maximum bandwidth is 24.576 MB/sec. This speed is sufficient for supporting the VGA (640×480) up to more than 30 video frames per second, and the bandwidth is about 18.423 MB/sec.

In the second use mode, only the compressed video streaming is transmitted, and the maximum bandwidth is 24.576 MB/sec too. As data is transmitted as compressed video streaming, it is costwise to adopt an 8 MB/sec bandwidth. Let the H.264 encoding format be taken for example. The 8 MB/sec bandwidth can support the Full-HD (1920×1080) up to 30 video frames per second, and the bandwidth is about 7.776 MB/sec if the compression rate is 12. However, the bandwidth can be dynamically adjusted to fit the needs in actual applications.

In the third use mode, the two VSAs (such as VSA 320 and VSA 325) are both used; and under time division duplex, the maximum bandwidths are 24.576 MB/sec and 24.576 MB/sec, respectively. Likewise, as data is transmitted as compressed video streaming, it is costwise to adopt an 8 MB/sec bandwidth to transmit the compressed data transmitted from the VSA 325.

| Use Mode | Maximum Support Bandwidth | Estimated Bandwidth Of Use |
| --- | --- | --- |
| Uncompressed Video Streaming | 24.576 MB/sec | 24.576 MB/sec |
| Compressed Video Streaming | 24.576 MB/sec | 8 MB/sec |
| Uncompressed Video Streaming + Compressed Video Streaming | 24.576 MB/sec + 24.576 MB/sec | 24.576 MB/sec + 8 MB/sec |

In the above embodiments of the invention, the conventional configuration of supporting one flow of UVC isochronous transfer is improved to be capable of supporting two flows of isochronous transfer by using one USB device only. Beside, in the present embodiment of the invention, a UVC compliant payload header is automatically added by the VSA instead of a micro controller, hence reducing the load of the micro controller and avoiding the loss of the real-time data. Further, as the configuration of the present embodiment of the invention supports transmission of video streaming or audio/video streaming in two different formats, there is no need to install a driver in the application of a video conference or digital home, further reducing the burden in hardware requirements and increasing convenience in use.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. An audio/video (AV) capture device, comprising:
   a signal source, capturing an external image to generate a first input video signal;
   an AV processor, receiving and compressing the first input video signal generated by the signal source to generate a second input video signal;
   a first video streaming adapter (VSA), receiving the first input video signal generated by the signal source and adding a first payload header onto the first input video signal to generate a first video streaming;
   a second video streaming adapter (VSA), receiving the second input video signal generated by the AV processor and adding a second payload header onto the second input video signal to generate a second video streaming;
   a micro controller, generating a command to the first and the second VSA; and
   a transmission unit coupled to the first VSA and the second VSA, transmitting the first video streaming generated by the first VSA and the second video streaming generated by the second VSA to an external device by time division duplex;
   wherein the first VSA and the second VSA communicate with each other through an interlock mechanism, to avoid the first VSA and the second VSA concurrently outputting the first video streaming and the second video streaming to the transmission unit.

2. The AV capture device according to claim 1, further comprising:
   an internal data bus coupled to the AV processor, the first and the second VSA, and the transmission unit;
   an internal command bus coupled to the micro controller; and
   a bus bridge coupled between the internal data bus and the internal command bus;
   wherein the micro controller writes the command on the internal command bus and sets the transmission unit via the bus bridge to support real-time data transmission.

3. The AV capture device according to claim 1, wherein after the transmission unit completes transmission of a data packet, the transmission unit informs the first VSA or the second VSA to retrieve a next data packet.

4. The AV capture device according to claim 2, wherein, the first VSA comprises:
   a first multiplexer, receiving the first input video signal transmitted from the signal source;

a counter coupled to the first multiplexer, counting the first input video signal passing through the first multiplexer;
a packet buffer coupled to the first multiplexer;
a header buffer coupled to the first multiplexer; and
a parameter buffer coupled to the header buffer, receiving a parameter transmitted from the micro controller;
wherein according to the parameter stored in the parameter buffer, when the counter counts that a amount of the first input video signal passing through the first multiplexer achieves a predetermined amount, the counter packs the first input video signal into a packet and stores in the packet buffer.

5. The AV capture device according to claim 4, wherein, the first VSA further comprises:
a controller coupled to the counter;
wherein when the counter packs the packet, the counter informs the controller to encode a first part of the first payload header and store in the header buffer.

6. The AV capture device according to claim 5, wherein, the first VSA further comprises:
a setting unit coupled to the controller;
wherein the setting unit informs the transmission unit to transmit data when the packet is temporarily stored in the packet buffer;
it is checked whether the internal data bus and the transmission unit are currently used by the second VSA through the interlock mechanism before the transmission unit transmits data, and if yes, the setting unit cannot transmit data before the second VSA releases control to the internal data bus and the transmission unit.

7. The AV capture device according to claim 5, wherein, the first part of the first payload header comprises whether the first video streaming belongs to the same video frame, whether the first video streaming is in a photo mode, and whether the first video streaming is an end of video frame.

8. The AV capture device according to claim 6, wherein, the first VSA further comprises:
an event control unit coupled to the parameter buffer; and
a second multiplexer coupled to the packet buffer and the header buffer;
wherein the event control unit detects whether transmission of the packet is completed, and informs the setting unit, the setting unit communicates with the transmission unit, so that a next packet stored in the packet buffer is transmitted to the transmission unit through the second multiplexer and the internal data bus;
the second multiplexer sequentially outputs the packet temporarily stored in the packet buffer or the first payload header temporarily stored in the header buffer; and
the controller adds a second part of the first payload header when the transmission unit retrieves the packet stored in the packet buffer.

9. The AV capture device according to claim 6, wherein, setting unit of the first VSA performs the interlock mechanism, wherein,
an initial state of the setting unit is an idle state;
the setting unit enters into a confirmation state to check the state of the transmission unit when the setting unit receives a transmission command, and the setting unit returns to the idle state if the transmission unit is busy and enters into a write state if the transmission unit is ready;
in the write state, the setting unit writes a packet parameter to the transmission unit, then the setting units enters an enablement state to activate the transmission unit; and
when the setting unit is in the write state, the setting unit sends an interlock signal to the second VSA to avoid the second VSA from transmitting data via the transmission unit.

10. The AV capture device according to claim 8, wherein, the first VSA further comprises:
a first bridge slave device coupled between the second multiplexer and the transmission unit;
a second bridge slave device coupled between the parameter buffer and the micro controller; and
a bridge master device coupled between the setting unit and the transmission unit.

11. The AV capture device according to claim 8, wherein, the second part of the first payload header comprises a time length of the first video streaming.

12. A digital audio/video (AV) capture method comprising:
capturing an external image to generate a first input video signal;
receiving and compressing the first input video signal to generate a second input video signal;
receiving the first input video signal and adding a first payload header onto the first input video signal to generate a first video streaming by a first video streaming adapter (VSA);
receiving the second input video signal and adding a second payload header onto the second input video signal to generate a second video streaming by a second video streaming adapter (VSA);
transmitting the first video streaming and the second video streaming to an external device by way of time division duplex; and
communicating the first VSA and the second VSA with each other through an interlock mechanism to avoid concurrently transmitting the first and the second video streaming to the external device during time division duplex transfer.

13. The method according to claim 12, further comprising:
counting a data amount of the first input video signal;
packing the first input video signal into a packet of the first video streaming and temporarily storing the packet of the first video streaming according to a parameter when the data amount of the first input video signal achieves a predetermined amount.

14. The method according to claim 13, further comprising:
encoding a first part of the first payload header and temporarily storing the first part of the first payload header when packing the first video streaming.

15. The method according to claim 14, further comprising:
transmitting the packet of the first video streaming to the external device after the packet of the first video streaming has been packed and temporarily stored;
checking whether a micro frame of the second video streaming is transmitted to the external device by the interlock mechanism before the packet of the first video streaming is transmitted;
if yes, the packet of the first video streaming is transmitted after the transmission of the micro frame of the second video streaming is completed.

16. The method according to claim 15, further comprising:
detecting whether transmission of the packet of the first video streaming is completed;
transmitting a next packet of the first video streaming to the external device;
sequentially outputting the first payload header and the packets of the first video streaming; and
adding a second part of the first payload header.

17. The method according to claim 16, wherein, the first part of the first payload header comprises whether the first video streaming belongs to the same video frame, whether the first video streaming is in a photo mode, and whether the first video streaming is an end of video frame.

18. The method according to claim 16, wherein, the second part of the first payload header comprises a time length of the first video streaming.

19. The method according to claim 16, wherein, the step of performing the interlock mechanism comprises:
setting an initial state as an idle state;
entering into a confirmation state to confirm a state of a transmission unit when receiving a transmission command, and returning to the idle state if the transmission unit is busy, and entering into a write state if the transmission unit is ready;
writing a packet parameter to the transmission unit in the write state;
entering into an enablement state to activate the transmission unit; and
sending an interlock signal to temporarily prevent transmission of the second video streaming to the transmission unit in the write state.

* * * * *

UNITED STATES PATENT AND TRADEMARK OFFICE
CERTIFICATE OF CORRECTION

| | | Page 1 of 1 |
|---|---|---|
| PATENT NO. | : 8,019,917 B2 | |
| APPLICATION NO. | : 12/604581 | |
| DATED | : September 13, 2011 | |
| INVENTOR(S) | : Yu-Min Chen et al. | |

It is certified that error appears in the above-identified patent and that said Letters Patent is hereby corrected as shown below:

On the Title Page, Item 73 (Assignee)

Please replace the Assignee name with the following:

--Quanta Computer Inc.--

Signed and Sealed this
Twenty-ninth Day of November, 2011

David J. Kappos
*Director of the United States Patent and Trademark Office*